US009066050B2

(12) United States Patent
Aguilar Fargas et al.

(10) Patent No.: US 9,066,050 B2
(45) Date of Patent: Jun. 23, 2015

(54) METHODS FOR TRANSMITTING AND RECEIVING AUDIOVISUAL CONTENT

(71) Applicant: MOTIVE TELEVISION, S.L., Barcelona (ES)

(72) Inventors: Joan Aguilar Fargas, Reus (ES); Teja Puneet Kamal Singh, Vienna (AT); Anthony Combe, Fife (GB)

(73) Assignee: Motive Television, S.L., Barcelona (ES)

( * ) Notice: Subject to any disclaimer, the term of this patent is extended or adjusted under 35 U.S.C. 154(b) by 0 days.

(21) Appl. No.: 14/358,960

(22) PCT Filed: Nov. 16, 2012

(86) PCT No.: PCT/ES2012/070800
§ 371 (c)(1),
(2) Date: May 16, 2014

(87) PCT Pub. No.: WO2013/072546
PCT Pub. Date: May 23, 2013

(65) Prior Publication Data
US 2014/0307173 A1    Oct. 16, 2014

(30) Foreign Application Priority Data
Nov. 18, 2011   (ES) .................................. 201131860

(51) Int. Cl.
*H04N 5/50*       (2006.01)
*H04H 20/16*      (2008.01)
(Continued)

(52) U.S. Cl.
CPC ................. *H04N 5/50* (2013.01); *H04H 20/16* (2013.01); *H04H 20/33* (2013.01); *H04H 20/40* (2013.01); *H04H 60/11* (2013.01); *H04H 60/23* (2013.01); *H04N 21/26275* (2013.01); *H04N 21/4263* (2013.01); *H04N 21/4425* (2013.01)

(58) Field of Classification Search
CPC ..... H04H 20/16; H04H 20/33; H04N 21/435; H04N 5/50
USPC .............. 348/423.1, 731, 723, 725, 729, 553; 380/200; 713/193
See application file for complete search history.

(56) References Cited

U.S. PATENT DOCUMENTS 7,319,753 B2 *   1/2008   Candelore et al. ............ 380/200
2008/0162406 A1   7/2008   St. John-Larkin

FOREIGN PATENT DOCUMENTS

ES              2306620 A1    1/2008
WO          WO 2005104556 A1  3/2005

OTHER PUBLICATIONS

International search report dated Feb. 28, 2013 in corresponding PCT Application No. PCT/ES2012/070800 filed Nov. 16, 2012.

*Primary Examiner* — Jefferey Harold
*Assistant Examiner* — Jean W Desir
(74) *Attorney, Agent, or Firm* — RatnerPrestia

(57) ABSTRACT

Method for transmitting and receiving audiovisual content in "push" environments without a return channel, in which a transmitter composed of at least one transponder transmits, to a set of receivers, each composed of a plurality of tuners, a transport signal comprising at least one audiovisual content channel, adapted to be received and directly reproduced in each receiver by virtue of the transponder which transmits said audiovisual content channel being tuned by each receiver, and a data channel associated with each audiovisual content channel, which comprises at least one audiovisual content, for the subsequent recording thereof in a storage device of each receiver.

4 Claims, 5 Drawing Sheets

(51) Int. Cl.
*H04H 20/33* (2008.01)
*H04H 20/40* (2008.01)
*H04H 60/11* (2008.01)
*H04N 21/262* (2011.01)
*H04N 21/426* (2011.01)
*H04N 21/4425* (2011.01)
*H04H 60/23* (2008.01)

METHODS FOR TRANSMITTING AND RECEIVING AUDIOVISUAL CONTENT

CROSS REFERENCE TO RELATED APPLICATIONS

This application is a 371 application of International Application No. PCT/ES2012/070800, filed Nov. 16, 2012, which claims priority to Spanish Patent Application 201131860, filed Nov. 18, 2011, all of which are incorporated by reference in its entirety herein.

The present invention relates to a method for sending and receiving audiovisual content in "push" transmissions, in other words, with no backward channel.

In particular, the invention relates to a method for sending and receiving audiovisual content via non-linear channels, in other words, via asynchronous transmission of audiovisual content via the data channel associated with each synchronous audiovisual content transmission channel or synchronous audiovisual channel. All audiovisual content transmitted asynchronously via a data channel is received and stored in a storage device comprised within an audiovisual content receiver, such as a television receiver decoder, for subsequent playback on a television screen.

Said method for sending and receiving can be applied to broadcast environments and, in particular, to all known digital television broadcast standards, such as the European standard Digital Video Broadcasting (DVB) for terrestrial television (DVB-Terrestrial or DVB-T), for satellite television (DVB-Satellite or DVB-S) or for cable television (DVB-Cable or DVB-C), and the North American standard, Advanced Television System Committee (ATSC), among others.

The broadcast of digital television programs, whether terrestrial, or via satellite or cable, is based on the standard for audio/video coding and compression MPEG-2 and MPEG-4 (this latter for high definition channels). Prior to its transmission, each audiovisual content is coded, compressed and encapsulated in fixed-size packets by means of one of said standards. Each packet belonging to a particular piece of audiovisual content is then identified by means of a packet identifier (PID or Packet ID), which allows each packet identifier (PID) to identify the type of audiovisual content contained in each packet and to be able to distinguish the information from among different audiovisual programs. Additionally, each packet identifier (PID) can be configured such that only one group of receivers registered to a service or platform be capable to decode the information packets contained in said packet identifiers (PID).

However, in platforms for asynchronously broadcasting audiovisual content via the data channel, each audiovisual content is transmitted only once by means of said data channel. This latter uses a small, residual part of the bandwidth used by its associated audiovisual channel, this audiovisual channel being designed to transmit data related to the programming (what are known as "metadata"), for interactive television applications and for sending other types of data. Since said data channel uses a marginal frequency of said bandwidth for transmitting at least one piece of audiovisual content, every piece of audiovisual content transmitted via the data channel is subject to interference and possible transmission and reception errors due to significant signal losses at the marginal transport frequency of said audiovisual content, and this subsequently prevents the content from being received and recorded adequately in the storage device of the receiver.

Therefore, an object of the present invention is to disclose a method for sending audiovisual content in asynchronous "push" transmissions via the data channel, which allows for reliable and secure reception of said audiovisual content transmitted by means of the data channel associated with an audiovisual channel in an audiovisual content receiver and which also remedies the aforementioned problems.

This is achieved according to the invention by a method for transmitting and receiving audiovisual content in "push" environments in the absence of a backward channel, in which a transmitter, comprising at least one transponder, transmits a transport signal to a set of receivers, each receiver comprising a plurality of tuners, which transport signal comprises:

at least one audiovisual channel having audiovisual content for receiving and directly playing said audiovisual content in each receiver by the tuning of said audiovisual channel, which is associated with the transponder which transmits said audiovisual channel, by each receiver; and a plurality of data channels, each being associated with an audiovisual channel and transmitting at least one piece of audiovisual content to be subsequently recorded in a storage device of each receiver, wherein during sending, each audiovisual content transmitted by a data channel is also transmitted at different points in time by means of each of the remaining data channels of the abovementioned plurality of data channels which are associated with their corresponding transponders;

during reception, each tuner of each receiver tunes a data channel associated with a different transponder to receive audiovisual content and to subsequently record all audiovisual content in said storage device of each receiver. By transmitting a certain piece of audiovisual content several times via different asynchronous data channels, the receiver, by switching its tuners, is capable to receive and store the audiovisual content that it has not been able to receive due to an error in transmission.

Preferably, the receiver prior to each recording procedure of each audiovisual content received via at least one data channel, checks whether each piece of audiovisual content has been stored. This prevents the same content from being stored several times.

Preferably, the transmitter periodically transmits information to the set of receivers via the data channels regarding the audiovisual content programming to be transmitted via each data channel associated with its corresponding transponder. In this way, each tuner of each receiver switches between the set of available transponders on the basis of the information regarding the audiovisual content programming transmitted by each transponder. Each receiver is thus able to safely and reliably store the audiovisual content which is of genuine interest to the user.

Preferably, each tuner of each receiver switches between the set of available transponders on the basis of the distance between each transponder and the receiver. This ensures greater reliability when the visual content is sent and received and the likelihood of errors in the transmission of said audiovisual content via the data channels is reduced.

Preferably, all the audiovisual content suitable to be transmitted via at least one data channel is encoded prior to transmission in at least one audiovisual content server of the transmitter.

Preferably, the audiovisual content suitable to be transmitted via at least one data channel is encrypted during transmission by means of an encryption key.

For a better understandings, various figures are appended, as an explanatory but non-limiting example, which describe the different parts of a preferred embodiment of the present invention.

Figure 1:
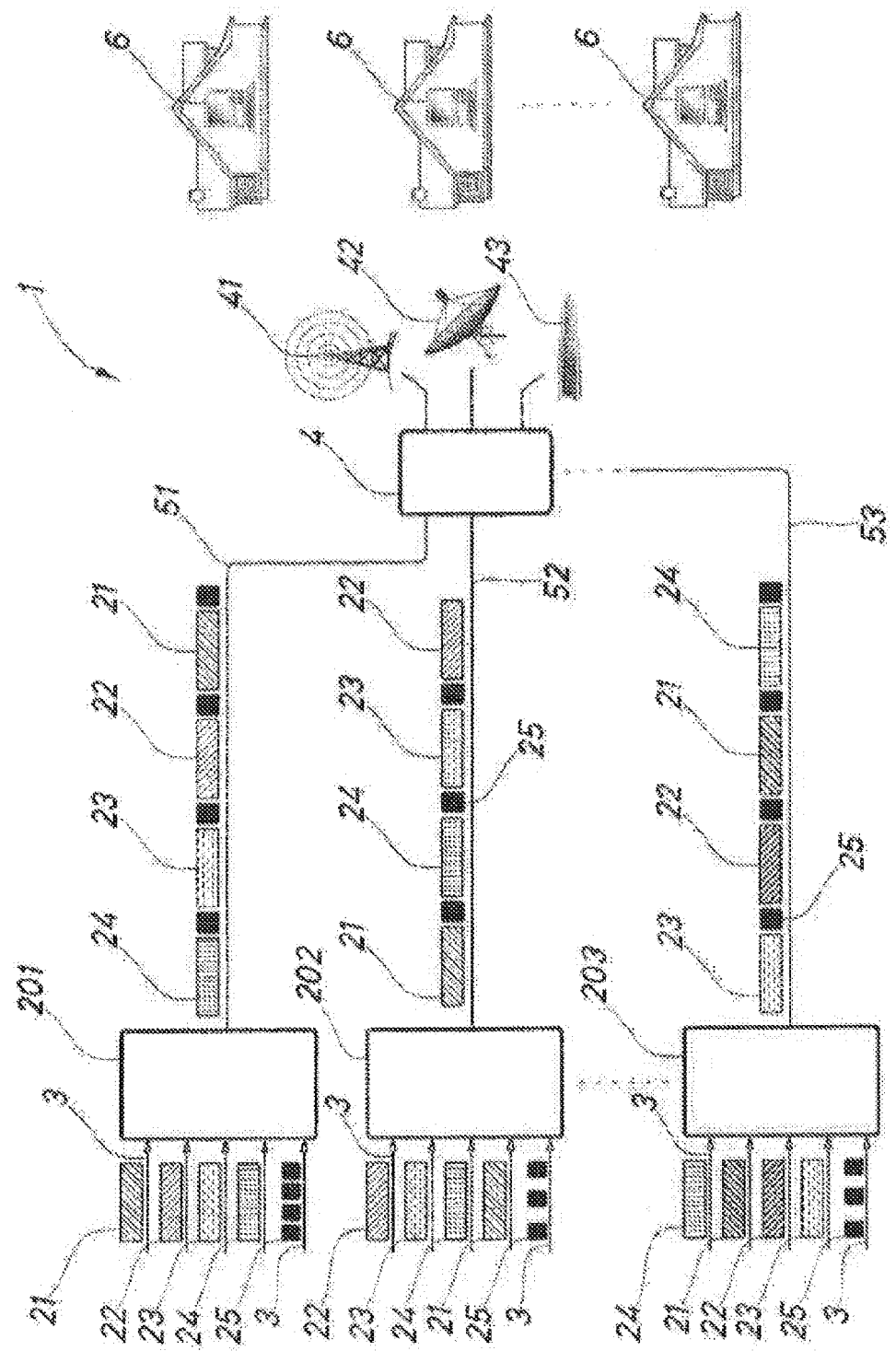
FIG. 1 shows an embodiment of a method for sending audiovisual content according to the present invention.

FIG. 1 shows a preferred embodiment of a "push" transmission platform -1-, that is, without a backward channel, for broadcasting audiovisual content both by means of at least one synchronous channel as well as an asynchronous data channel -3- associated with each of the synchronous audiovisual content channels. Said transmission platform -1- can be applied to all known digital television broadcast standards, such as, among others, the European standard Digital Video Broadcasting (DVB) for terrestrial television -41- (DVB Terrestrial or DVB-T), for satellite television -42- (DVB-Satellite or DVB-S) or for cable television -43- (DVB-Cable or DVB-C), and the North American standard, Advanced Television System Committee (ATSC).

Each asynchronous data channel -3- uses a bandwidth of its associated synchronous audiovisual content channel. In this regard, in Spain's Digital Terrestrial Television (Televisión Digital Terrestre, TDT) for example, each data channel can use a maximum of 20% of the bandwidth of the audiovisual content channel. Normally, each asynchronous data channel -3- is used for sending data regarding the programming (what are known as metadata), as well as data related to interactive television applications, and signalling and tuning applications for transmission. However, it is possible to send audiovisual content together with recording commands within the stream of data of said asynchronous data channels -3-. For reasons of simplicity, the synchronous audiovisual content channels have been omitted and only the asynchronous data channels -3- respectively associated with each of said synchronous audiovisual content channels have been shown.

Said platform -1- comprises at least one transponder -201-, also known as a multiplex transponder or "muxponder", which can merge different data channels -3- with streams of audiovisual content and different data (-21, -22-, -23-, -24-) into a single stream -51- containing audiovisual content and other data. As an example, FIG. 1 shows three transponders -201-, -202- and -203-, but this does not necessarily limit the number of transponders to three. Furthermore, each multiplex transponder -201-, -202- and -203- allows each of the channels -3- merged into one single stream -51-, -52- and -53- of audiovisual content, respectively merged by each multiplex transponder -201-, -202- and -203-, to change from a lower bit rate (lower frequency) to a higher bit rate (higher frequency).

Once all the audiovisual content of each data channel -3- has been merged into its respective audiovisual content streams -51-, -52-, -53- by each multiplex transponder -201-, -202- and -203-, said streams -51-, -52-, -53- are merged by a multiplex transponder -4- into a single audiovisual content transport stream (TS) which is then transmitted via terrestrial -41-, satellite -42- or cable -43-.

The audiovisual content suitable to be sent via at least one asynchronous data channel -3- is stored, prior to its transmission, in servers of the transmission head end (not shown.)

During transmission, each transponder -201-, -202- and -203- transmits a sequence of audiovisual content, which differs on account of its respective stream -51-, -52-, -53- of merged audiovisual content. Therefore, and as an example, a first transponder -201- merges the audiovisual content in the following sequential order (-21-, -22-, -23-, -24-) such that the first and last piece of audiovisual content transmitted are the pieces of audiovisual content -21- and -24-, respectively. At the same time, a second transponder -202- merges the audiovisual content (-22-, -23-, -24-, -21-) such that the first and the last pieces of audiovisual content are the pieces of audiovisual content -22- and -21-, respectively. Also at the same time, and as an example, a third transponder -203- merges the audiovisual content (-24-, -21-, -22-, -23-) such that the first and last pieces of audiovisual content transmitted are the pieces of audiovisual content -24- and -23-, respectively. Therefore, each transponder -201-, -202- and -203- transmits an identical piece of content -21-, -22-, -23- or -24- at different points in time, each of the transponders -201-, -202- and -203- following a different sequence of transmission of the audiovisual content.

Periodically, each multiplex transponder -201-, -202- and -203- transmits information -25- to the set of receivers -6- regarding the sequence of audiovisual content to be transmitted. This information -25- is also transmitted via the data channels -3- associated with the synchronous audiovisual content channels. In this way, each receiver -6- knows which audiovisual content is being transmitted asynchronously via the different data channels associated with different multiplex transponders.

It should be noted that all the audiovisual content transmitted via said platform -1-, whether via terrestrial -41-, satellite -42- or cable -43-, is sent according to the audio/video coding and compression standards MPEG-2 and MPEG-4 (this latter relating to high definition channels). Prior to its transmission, all the audiovisual content is encrypted, compressed and encapsulated in fixed-size packets by means of one of these standards. Each packet belonging to a certain piece of audiovisual content is then identified by means of a packet identifier (PID). In this way, each packet identifier (PID) can identify the type of audiovisual content included in each packet and thus distinguish the information from among different audiovisual programs. Additionally, each packet identifier (PID) can be configured such that only one group of receivers registered to a service or platform can decode the information packets contained in said packet identifiers (PID). In this case in particular, the audiovisual content -21-, -22-, -23-, -24- and -25- is transmitted in a hidden PID such that only the receivers -6- registered for the service of said platform -1- can receive the audiovisual content transmitted with said hidden PID.

Figure 2:
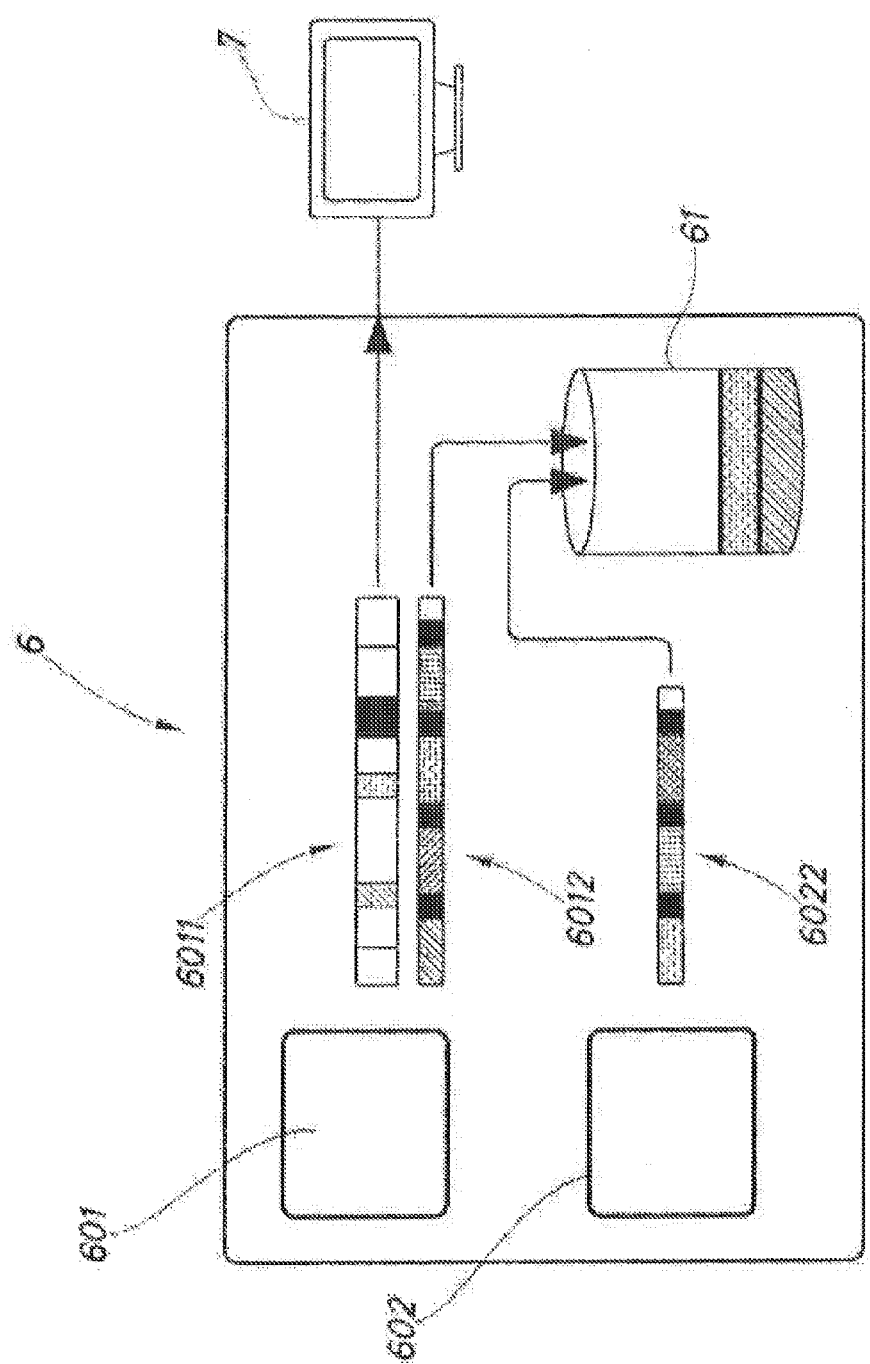
FIG. 2 shows a first embodiment of a method, according to the present invention, for receiving audiovisual content by a receiver.

FIG. 2 shows a first embodiment of a method according to the present invention for receiving audiovisual content by a receiver -6-. As an example, said receiver -6- comprises at least two, but possibly more, front-end receivers -601-, -602-, each of which is responsible for tuning, receiving and demodulating a different audiovisual content channel. Normally, each front-end audiovisual content receiver -601-, -602- comprises a tuning module (not shown) which can select the particular frequency of a synchronous audiovisual content channel within the transport stream (TS) of audiovisual content.

One of the front-end receivers from among a plurality of possible front-end receivers within a single receiver -6- is dedicated to tuning a synchronous audiovisual content channel for direct playback of the content on an audiovisual content display screen -7-, such as a television screen, a PC monitor or the like. The remaining front-end receivers also allow other synchronous audiovisual channels to be tuned. However, the audiovisual content received by said synchronous channels can either be stored in a memory device -61-, such as a hard drive, a flash memory or the like, for subsequent playback at a time desired by the user, or discarded depending on a user profile record which specifies the types of audiovisual content in which the user is interested.

During the reception of the audiovisual content by the different asynchronous data channels, which content is transmitted in accordance with the method according to the present invention, each front-end receiver from among said plurality of front-end receivers in the receiver -6- tunes a different data channel depending on the information -25- regarding the sequence of audiovisual content to be transmitted by each transponder. This sequence information -25- of each transponder is sent and stored in each receiver of the system.

As has been previously noted in FIG. 1, each multiplex transponder -201-, -202- and -203- periodically transmits information -25- to the set of receivers -6- regarding the sequence of audiovisual content to be transmitted. This information -25- is also periodically transmitted by means of the data channels -3- associated with the synchronous audiovisual content channels. In this way, each receiver -6- knows which audiovisual content is being transmitted asynchronously via the different data channels associated with different multiplex transponders. Each receiver -6- is thus capable of knowing which audiovisual content is sent by each multiplex transponder, that is to say, via each asynchronous data channel. Therefore, each front-end receiver of each receiver switches between the set of available multiplex transponders -201-, -202- and -203- on the basis of the information regarding the programming of the audiovisual content from each transponder.

Thus, in the embodiment of FIG. 2 for example, the front-end receiver -601- of the receiver -6- tunes a synchronous audiovisual content channel -6011- associated with a particular transponder, according to the choice of the user, for direct playback thereof on the television screen -7-. Additionally, the data channel -6012-, which is associated with said audiovisual content channel -6011- and takes up a part of the bandwidth assigned to said synchronous audiovisual content channel -6011-, is also tuned by said front-end receiver -601-. However, this data channel -6012- is not suitable to be played back directly on the television screen -7-. The audiovisual content received by this data channel -6012- will be recorded and stored in the memory device -61- to be played back at a later occasion.

At the same time, another front-end receiver -602- tunes another synchronous channel associated with a different transponder to the transponder tuned by the front-end receiver -601- (not shown). However, this front-end receiver -602- only processes the part of the bandwidth assigned to the asynchronous data channel -6022-, by means of which at least one piece of audiovisual content of interest to the user is received and stored in the memory device -61-. Said front-end receiver -602- is free to tune any asynchronous data channel associated with different transponders, unlike the front-end receiver -601-, the tuning of which is determined by the user. Therefore, the front-end receiver -602- can switch between different transponders depending on the information -25- regarding the audiovisual content sequence, received periodically by each receiver -6-, to be transmitted by each transponder.

For example, said front-end receiver -602- is capable of tuning the transponder -201- for receiving audiovisual content -22- at the point in time when the audiovisual content -22- is being transmitted by said transponder -201-, and once the audiovisual content -22- has been received and recorded, said front-end receiver -602- is capable to tune the transponder -203- to receive the audiovisual content -23- transmitted at a time following the transmission of the audiovisual content -22- by the transponder -201-.

It should be noted that during this process of receiving audiovisual content by said front-end receiver -602-, said front-end receiver -602- is able to receive said audiovisual content by switching the tuning to any other transponder which is programmed to transmit this audiovisual content in the event that at least one piece of audiovisual content of interest to the user cannot be received due to interference and possible transmission errors. Therefore, and continuing with the previous example, if said front-end receiver -602- has not been able to receive and store the audiovisual content -22- transmitted by the transponder -201-, said front-end receiver -602- is able to tune the transponder -203- to receive and record the audiovisual content -22- transmitted at a later point in time, as can be seen in FIG. 1.

It should also be noted that, in the event that a particular piece of audiovisual content was already stored in the memory device -61-, the same audiovisual content would not be recorded again. To this end, the audiovisual content recorded in the memory device -61- is detected. Each piece of audiovisual content is identified by a unique number assigned by the content transmitter. This identifier is included in the information -25- regarding the sequence of transmitted content and is stored in the memory device -61- of the receiver together with the audiovisual content. In this way, the detection of content already stored consists in comparing said identifiers.

Figure 3:
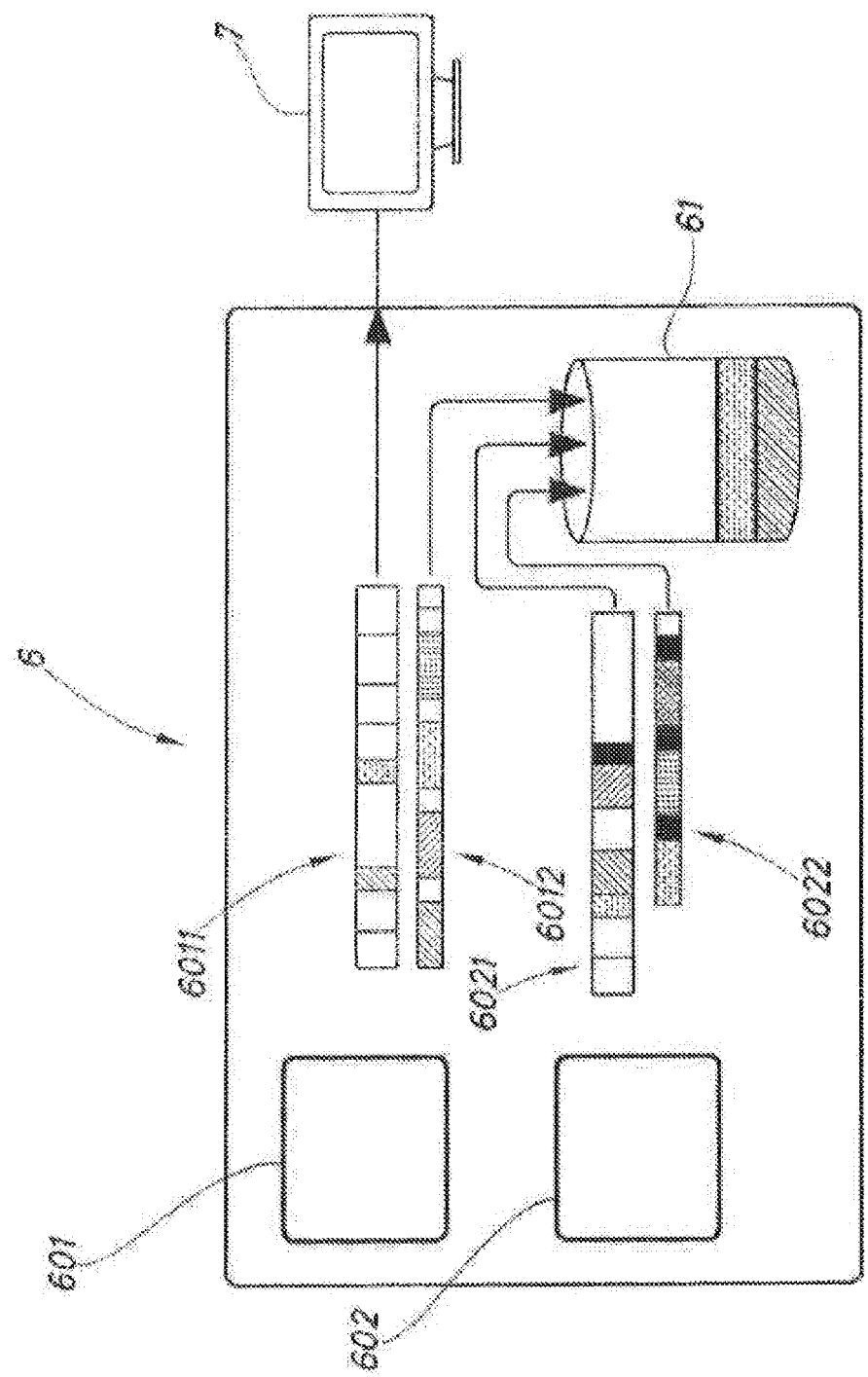
FIG. 3 shows a second embodiment of a method, according to the present invention, for receiving audiovisual content by a receiver.

In the embodiment of FIG. 3, the user intends to view a specific synchronous channel -6011- and also record at least one piece of audiovisual content transmitted via the synchronous channel -6021- at the same time as said specific piece of audiovisual content is transmitted. For this, the front-end receiver -601- of the receiver -6- tunes said synchronous audiovisual content channel -6011- associated with the corresponding transponder for direct playback thereof on the television screen -7-. Additionally, the data channel -6012-, which is associated with said audiovisual content channel -6011- and takes up a part of the bandwidth assigned to said synchronous audiovisual channel -6011-, is also tuned by said first front-end receiver -601-. However, said data channel -6012- is not suitable to be directly played back on the television screen -7-.

At the same time, another front-end receiver -602- is suitable to tune another synchronous channel associated with a different transponder to the transponder tuned by the front-end receiver -601-. While the audiovisual content of interest to the user is transmitted via the synchronous audiovisual content channel -6021- associated with the correct transponder, said front-end receiver -602- tunes the synchronous channel -6021- to receive and record the audiovisual content of interest to the user, according to the recording command of the user. Additionally, the data channel -6022-, which is associated with said synchronous audiovisual content channel -6021- and takes up a part of the bandwidth assigned to said synchronous audiovisual content channel -6021-, is also tuned by said front-end receiver -602-. However, said data channel -6022- is not suitable to be directly played back on the television screen -7-.

Figure 4:
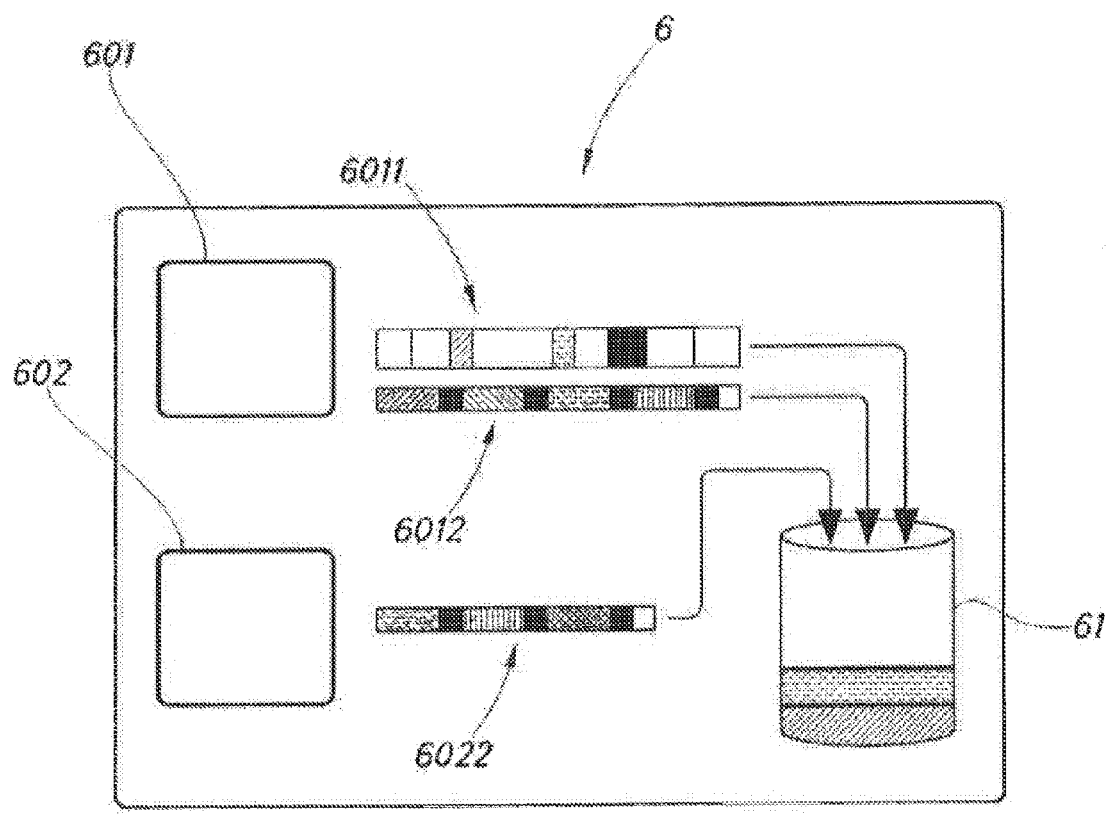
FIG. 4 shows a third embodiment of a method, according to the present invention, for receiving audiovisual content by a receiver.

In the embodiment of FIG. 4, the user is not viewing any specific synchronous channel; he does, however, wish to record a specific piece of audiovisual content transmitted via a synchronous audiovisual content channel -6011- while said specific audiovisual content is being transmitted by the correct transponder. Therefore, while the audiovisual content of interest to the user is transmitted via the synchronous audiovisual content channel -6011- associated with the correct transponder, said front-end receiver -601- tunes said synchronous channel -6011- to receive and record the audiovisual content of interest to the user, according to the recording command of the user. Additionally, the data channel -6012-, which is associated with said synchronous audiovisual content channel -6011- and takes up a part of the bandwidth assigned to said synchronous channel -6011-, is also tuned by said front-end receiver -601-. However, said data channel -6012- is not suitable to be directly played back on the television screen -7-.

At the same time, another front-end receiver -602- tunes another synchronous channel associated with a different transponder to the transponder tuned by the front-end receiver -601- (not shown). However, this front-end receiver -602- only processes the part of the bandwidth assigned to the asynchronous data channel -6022-, by means of which at least one piece of audiovisual content of interest to the user is received and stored in the memory device -61-. Said front-end receiver -602- is free to tune any asynchronous data channel associated with different transponders, unlike the front-end receiver -601-, the tuning of which is determined by the user, both for direct playback of a particular synchronous channel and for the programmed recording of audiovisual content. Therefore, the front-end receiver -602- can switch between different transponders depending on the information -25- regarding the audiovisual content sequence, received periodically by each receiver -6-, to be transmitted by each transponder.

Figure 5:
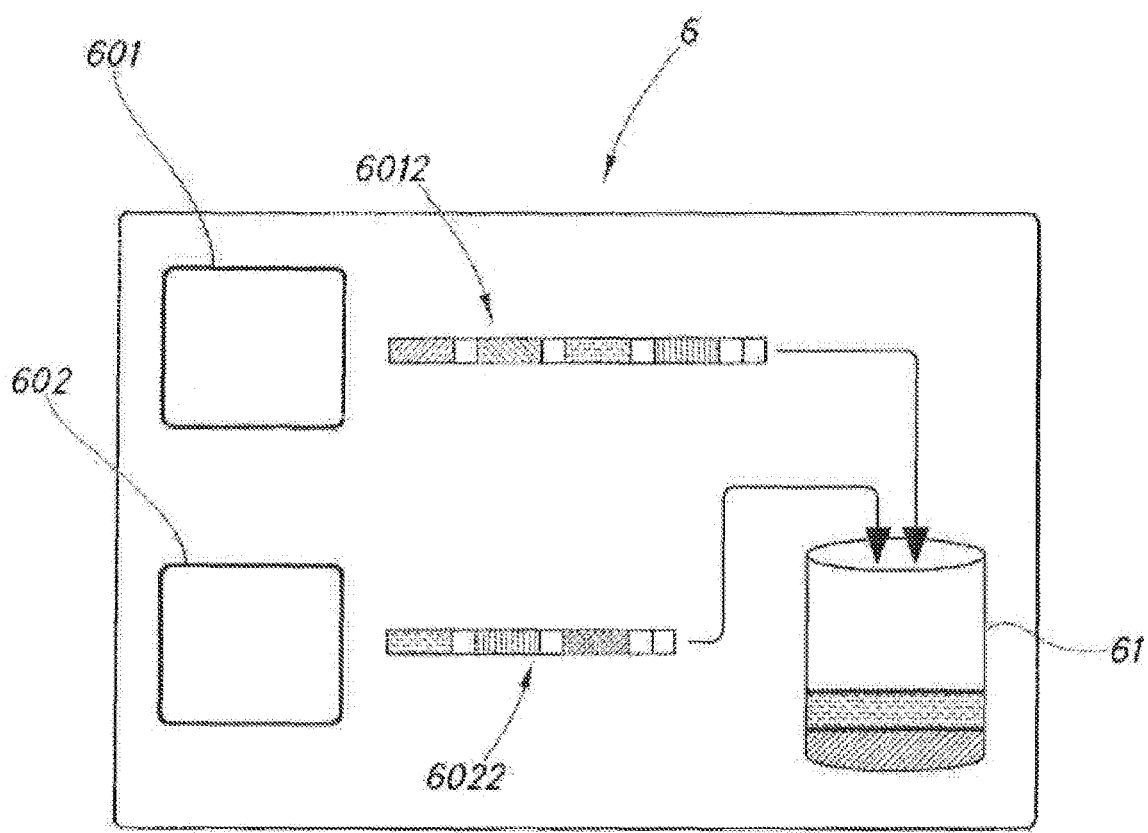
FIG. 5 shows a fourth embodiment of a method, according to the present invention, for receiving audiovisual content by a receiver.

Finally, in the embodiment of FIG. 5, the user is not viewing any specific synchronous channel and does not wish to record any specific audiovisual content. In this case, the front-end receivers -601-, -602- are free to tune any transponder depending on the audiovisual content which each of the transponders plans to transmit. Therefore, the data channel -6012- associated with the synchronous audiovisual content channel -6011- (not shown) is tuned by said front-end receiver -601- to receive and record at least one piece of audiovisual content of interest to the user.

At the same time, another front-end receiver -602- tunes another data channel -6022- associated with the synchronous audiovisual content channel -6021-, which is in turn associated with a different transponder to the transponder tuned by the front-end receiver -601- (not shown) to receive and record at least one piece of audiovisual content of interest to the user.

Although the invention has been described in relation to a preferred embodiment, this should not be considered limiting to the invention, the scope of which is defined by the widest interpretation of the following claims.

The invention claimed is:

1. A method for sending and receiving audiovisual content in "push" environments without a backward channel, in which a transmitter, comprising at least one transponder, transmits to a set of receivers, each receiver comprising a plurality of tuners, a transport signal which comprises:
   at least one audiovisual channel having audiovisual content for directly receiving and playing said audiovisual content in each receiver by the tuning of said audiovisual channel, which is associated with the transponder which transmits said audiovisual channel, by each receiver; and
   a plurality of data channels, each being associated with an audiovisual channel and transmitting at least one piece of audiovisual content to be subsequently recorded in a storage device of each receiver,
   wherein
   during sending, each audiovisual content transmitted via a data channel is also transmitted at different times by means of each of the remaining data channels of the abovementioned plurality of data channels which are associated with the corresponding transponders thereof;
   during reception, each tuner of each receiver tunes a data channel associated with a different transponder to receive audiovisual content and to subsequently record all audiovisual content in said storage device of each receiver;
   the transmitter periodically transmits information to the set of receivers via the data channels regarding the programming of the audiovisual content to be transmitted via each data channel associated with its corresponding transponder; and
   each tuner of each receiver switches between the set of available transponders based on the information regarding the programming of the audiovisual content to be transmitted by each transponder.

2. The method of claim 1; wherein the receiver prior to each recording procedure of each audiovisual content received via at least one data channel, checks whether said piece of audiovisual content has been stored or is being stored.

3. The method of claim 1; wherein all the audiovisual content suitable to be transmitted via at least one data channel are encrypted, prior to transmission, in at least one audiovisual content server of the transmitter.

4. The method of claim 1; wherein the audiovisual content suitable to be transmitted via at least one data channel is encrypted during transmission by means of an encryption key.

* * * * *